(12) United States Patent
Hausladen et al.

(10) Patent No.: US 9,399,262 B2
(45) Date of Patent: Jul. 26, 2016

(54) METHOD OF JOINING TITANIUM AND TITANIUM-BASED ALLOYS TO FERROUS METALS USING TANTALUM

(75) Inventors: Anthony Hausladen, Lester Prairie, MN (US); Mark Steven Lewandowski, Hutchinson, MN (US); Ryan Bennett Sefkow, Carver, MN (US)

(73) Assignee: Lake Region Manufacturing, Inc., Chaska, MN (US)

( * ) Notice: Subject to any disclaimer, the term of this patent is extended or adjusted under 35 U.S.C. 154(b) by 315 days.

(21) Appl. No.: 13/327,055

(22) Filed: Dec. 15, 2011

(65) Prior Publication Data

US 2013/0156493 A1 Jun. 20, 2013

(51) Int. Cl.
| B23K 9/26 | (2006.01) |
|---|---|
| B23K 9/23 | (2006.01) |
| B23K 15/00 | (2006.01) |
| B23K 26/26 | (2014.01) |
| B23K 26/32 | (2014.01) |

(52) U.S. Cl.
CPC ............. *B23K 9/232* (2013.01); *B23K 15/0093* (2013.01); *B23K 26/26* (2013.01); *B23K 26/32* (2013.01); *B23K 26/323* (2015.10); *B23K 2201/18* (2013.01); *B23K 2203/08* (2013.01); *B23K 2203/24* (2013.01); *Y10T 403/479* (2015.01)

(58) Field of Classification Search
CPC .......... B23K 1/00; B23K 1/002; B23K 26/00; B23K 26/20; A61B 5/00
USPC ................. 219/85.1, 121.63, 121.64, 121.66, 219/121.65, 121.85, 129; 403/272
See application file for complete search history.

(56) References Cited

U.S. PATENT DOCUMENTS

| 3,038,988 | A | 4/1961 | Kessler et al. |
| 4,674,675 | A | 6/1987 | Mietrach |
| 4,708,282 | A | 11/1987 | Johnsen et al. |
| 5,488,959 | A * | 2/1996 | Ales ............................ 600/585 |
| 6,329,069 | B1 | 12/2001 | Azizi et al. |
| 6,379,392 | B1 | 4/2002 | Walak |
| 6,410,165 | B1 | 6/2002 | Warren et al. |
| 6,866,730 | B2 | 3/2005 | Cheng et al. |
| 6,875,949 | B2 | 4/2005 | Hall |
| 7,178,710 | B2 | 2/2007 | Jiang et al. |
| 7,747,314 | B2 | 6/2010 | Parins et al. |

(Continued)

FOREIGN PATENT DOCUMENTS

| EP | 1444993 | 10/2006 |
| JP | 03-210978 JP | 9/1991 |
| WO | 2006076447 | 7/2006 |
| WO | 2006104823 | 10/2006 |

OTHER PUBLICATIONS

Patent Abstracts of Japan, Kunama, JP 03-210978, 1991—Machine Translation.*

(Continued)

*Primary Examiner* — Brian Jennison
(74) *Attorney, Agent, or Firm* — Michael F. Scalise; Grady J. Frenchick

(57) ABSTRACT

A method of joining, e.g., by fusion welding, titanium, and titanium-based alloys to ferrous metals, and the intermetallic weld pool created by practice of the method is described. The instant invention involves the use, inclusion or deployment of tantalum into the weld pool and upon cooling a weld, to create a surprisingly strong intermetallic bond, weld, or joint.

20 Claims, 14 Drawing Sheets

(56) References Cited

U.S. PATENT DOCUMENTS

| | | |
|---|---|---|
| 7,767,318 B2 | 8/2010 | Cheng et al. |
| 7,841,994 B2 | 11/2010 | Skujins et al. |
| 7,996,974 B2 | 8/2011 | Kozak et al. |
| 2005/0060025 A1 | 3/2005 | MacKiewicz et al. |

OTHER PUBLICATIONS

Chou, W.J., "Mechanical properties in TiN thin film coatings on 304 stainless steel substrates" Surface and Coatings Technology 149 (2002) 7-13.

* cited by examiner

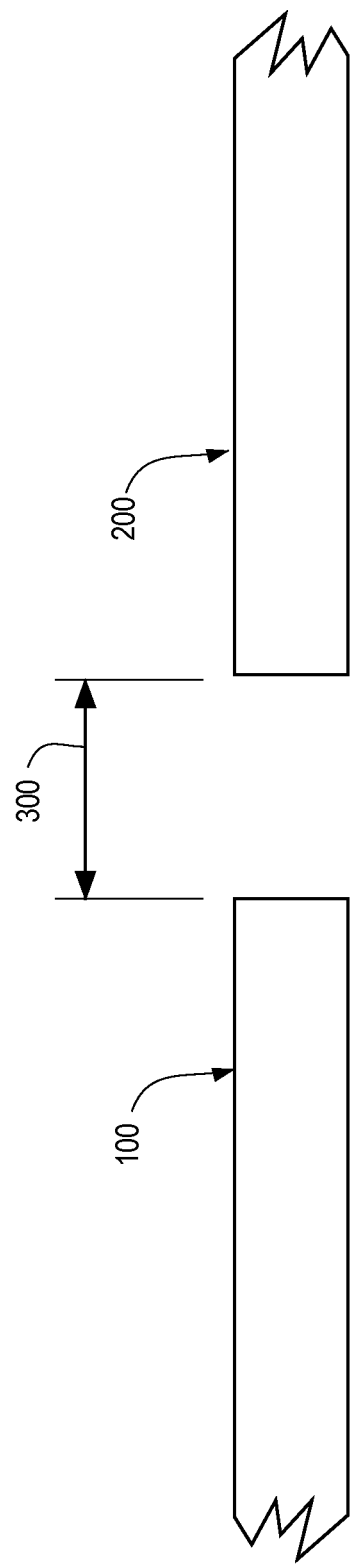

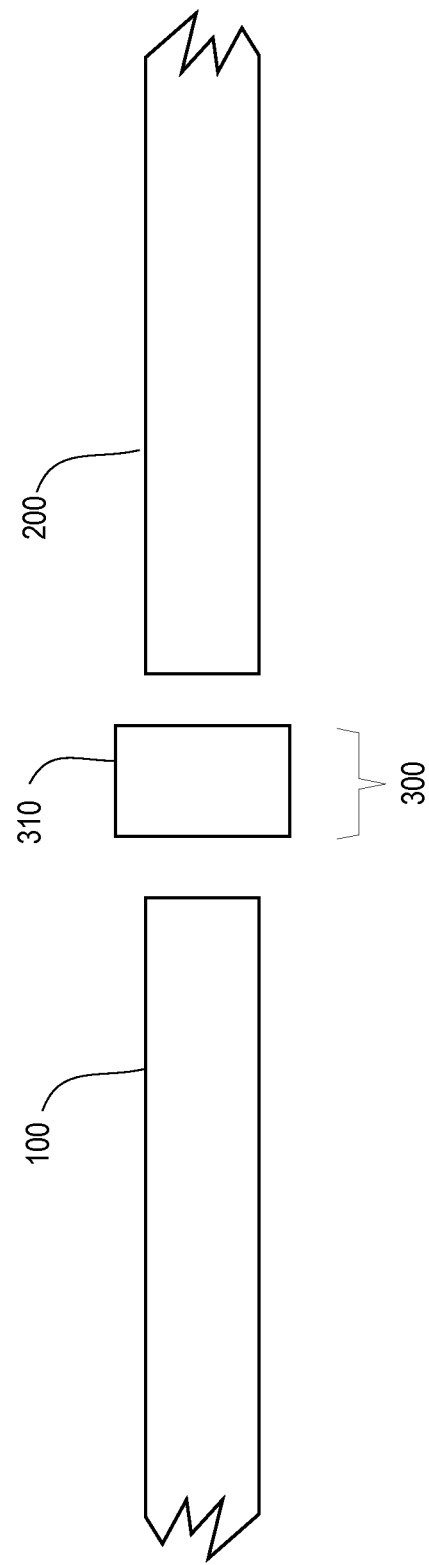

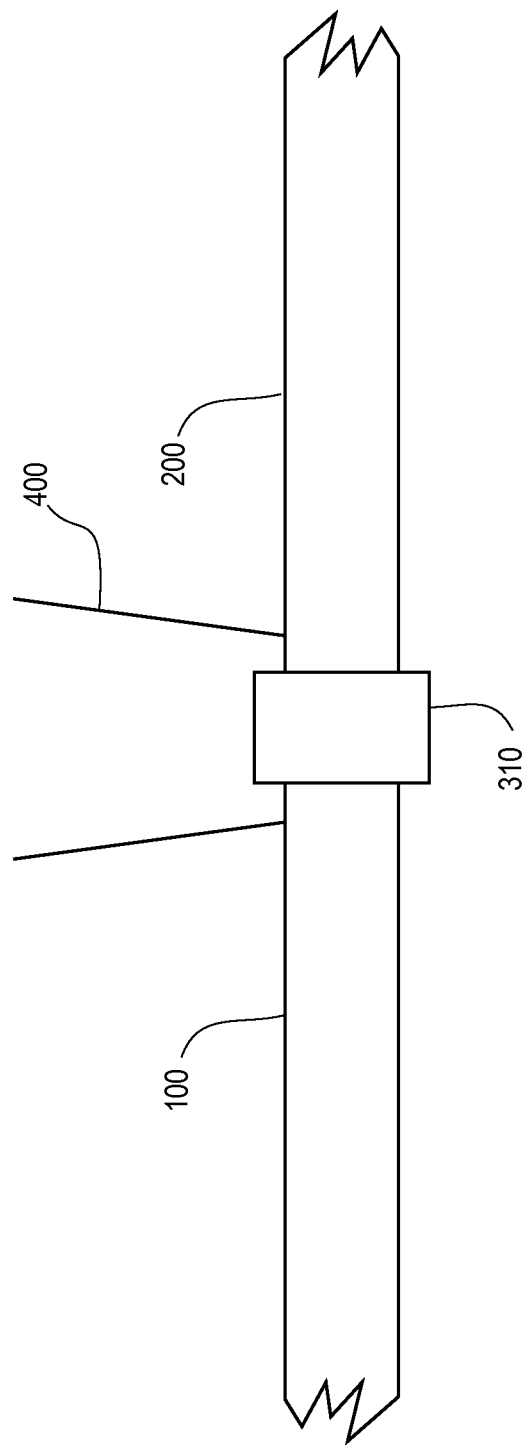

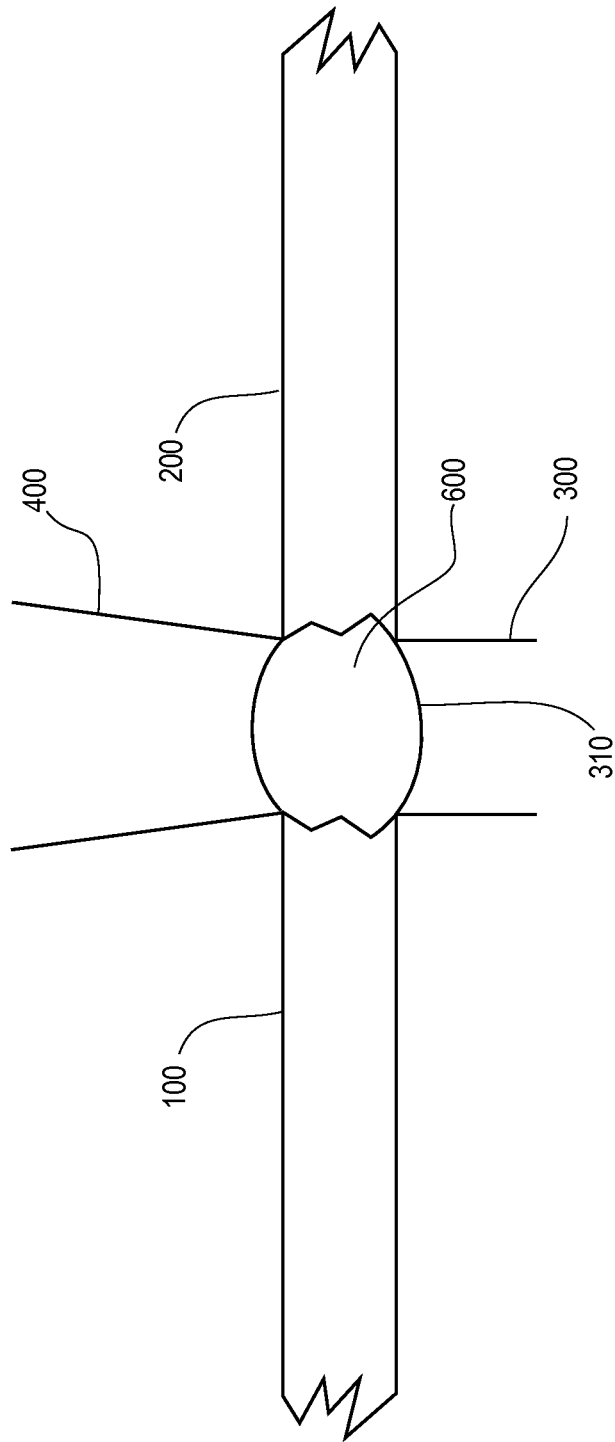

Test Piece Configurations

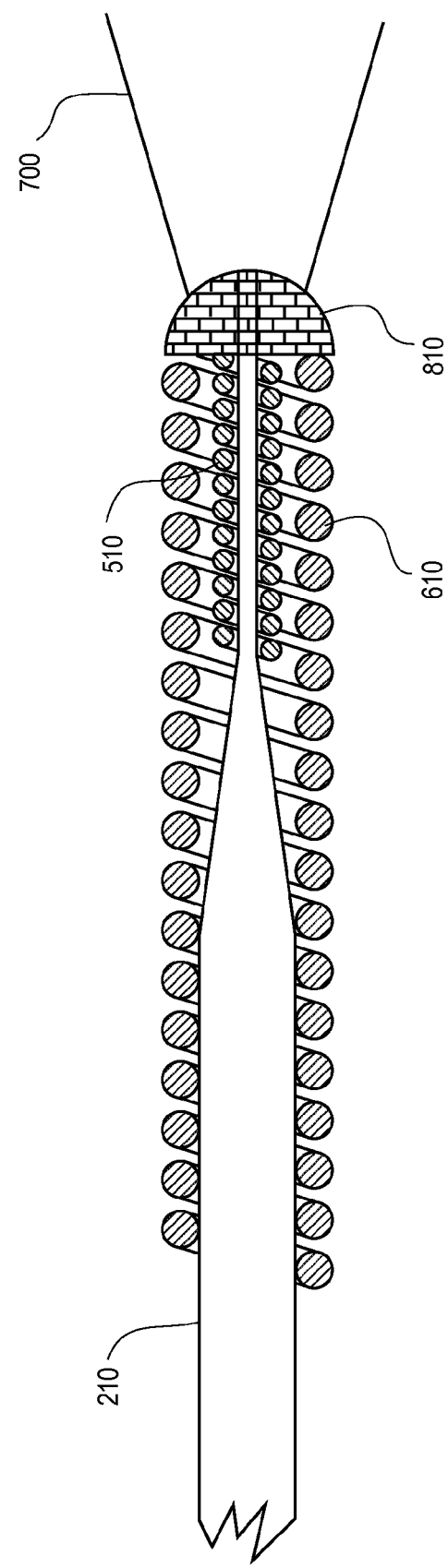

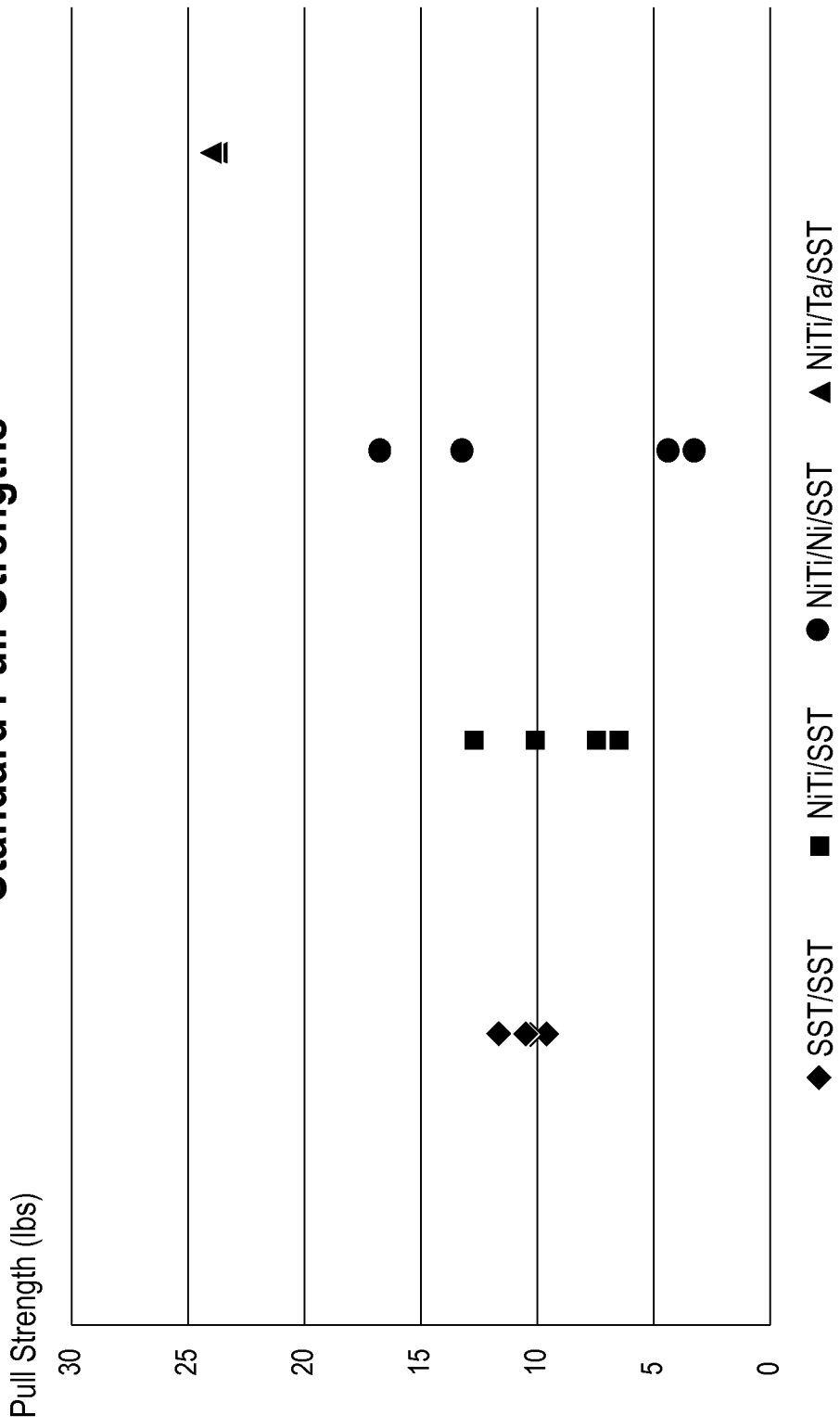

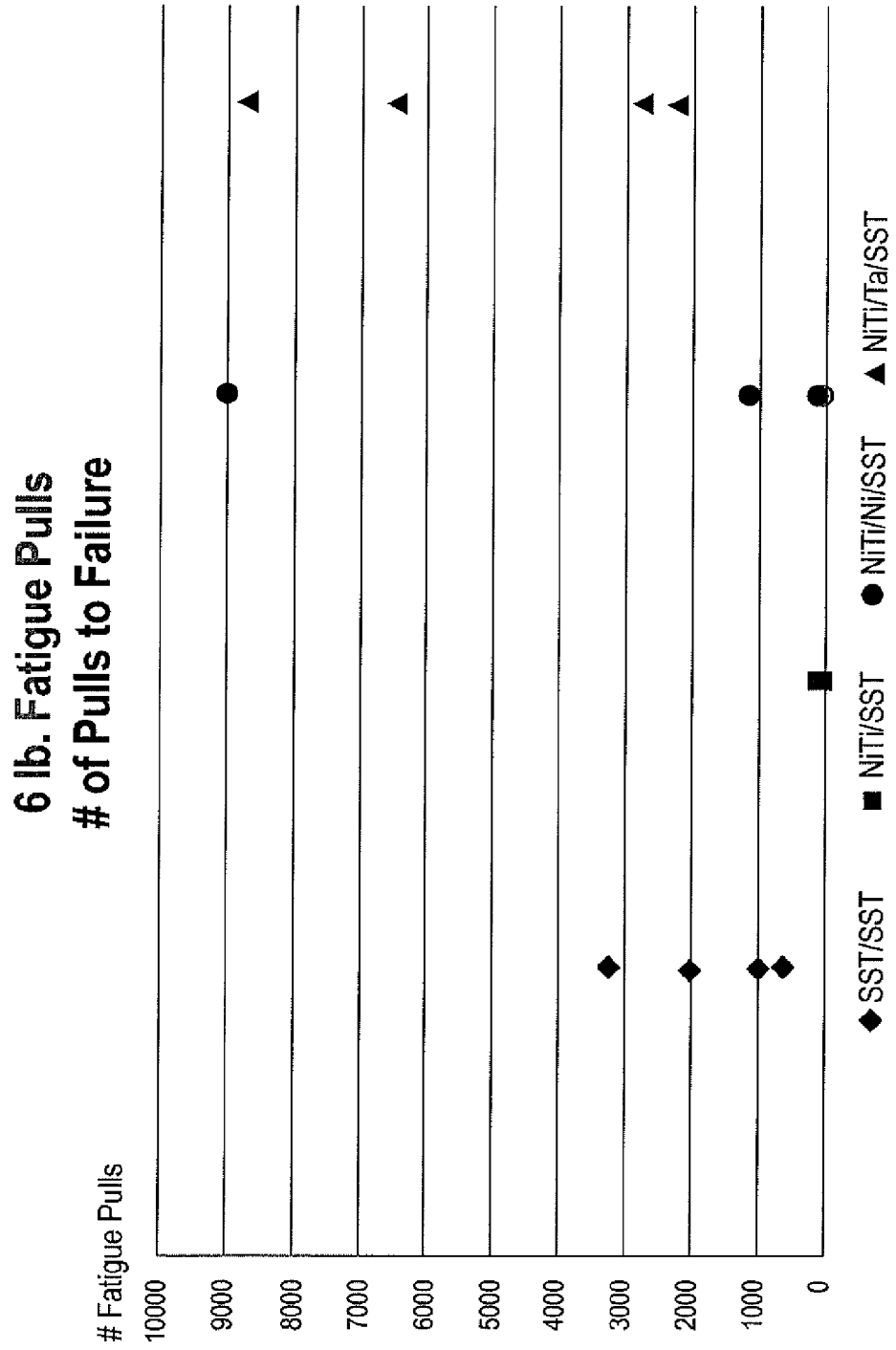

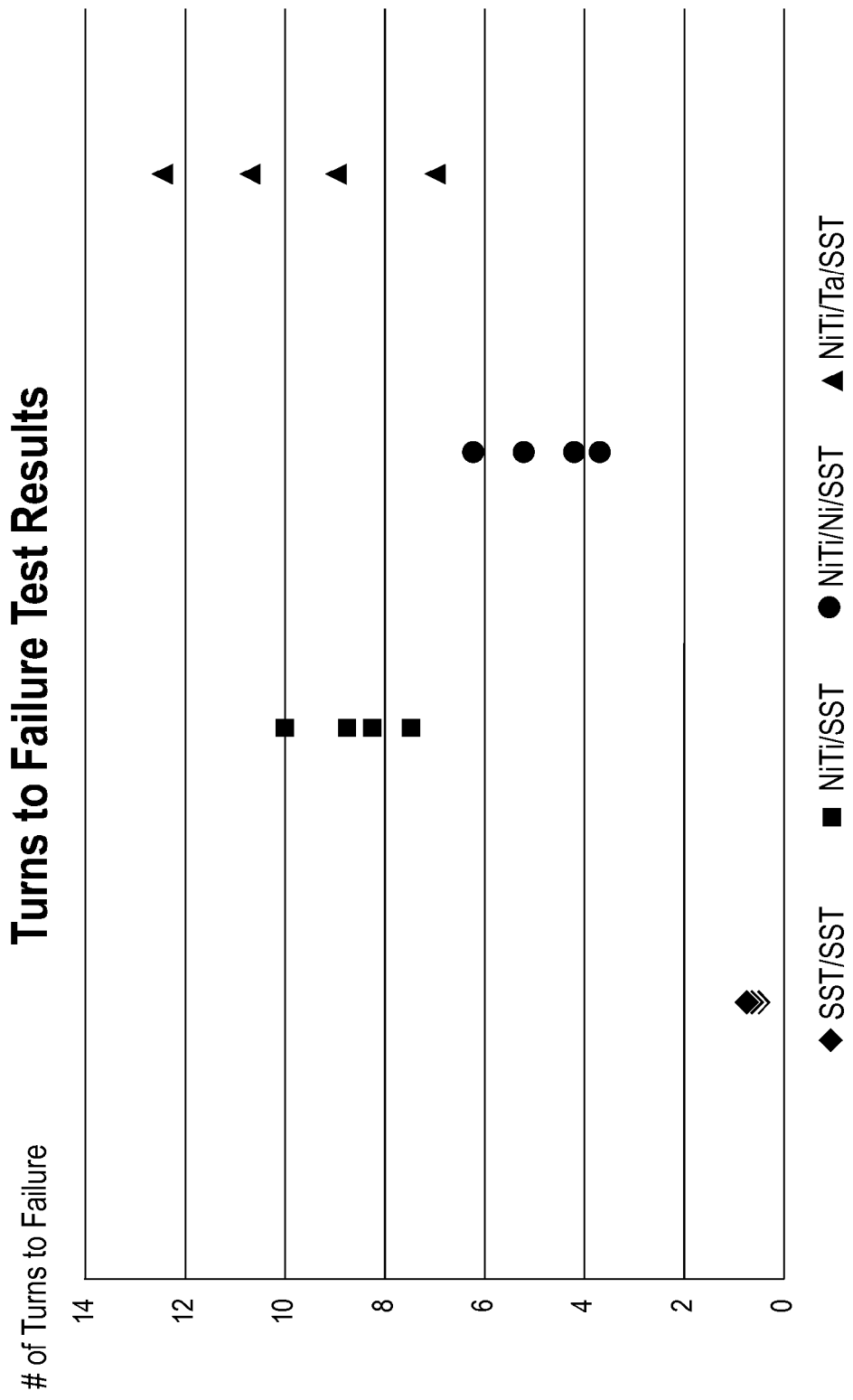

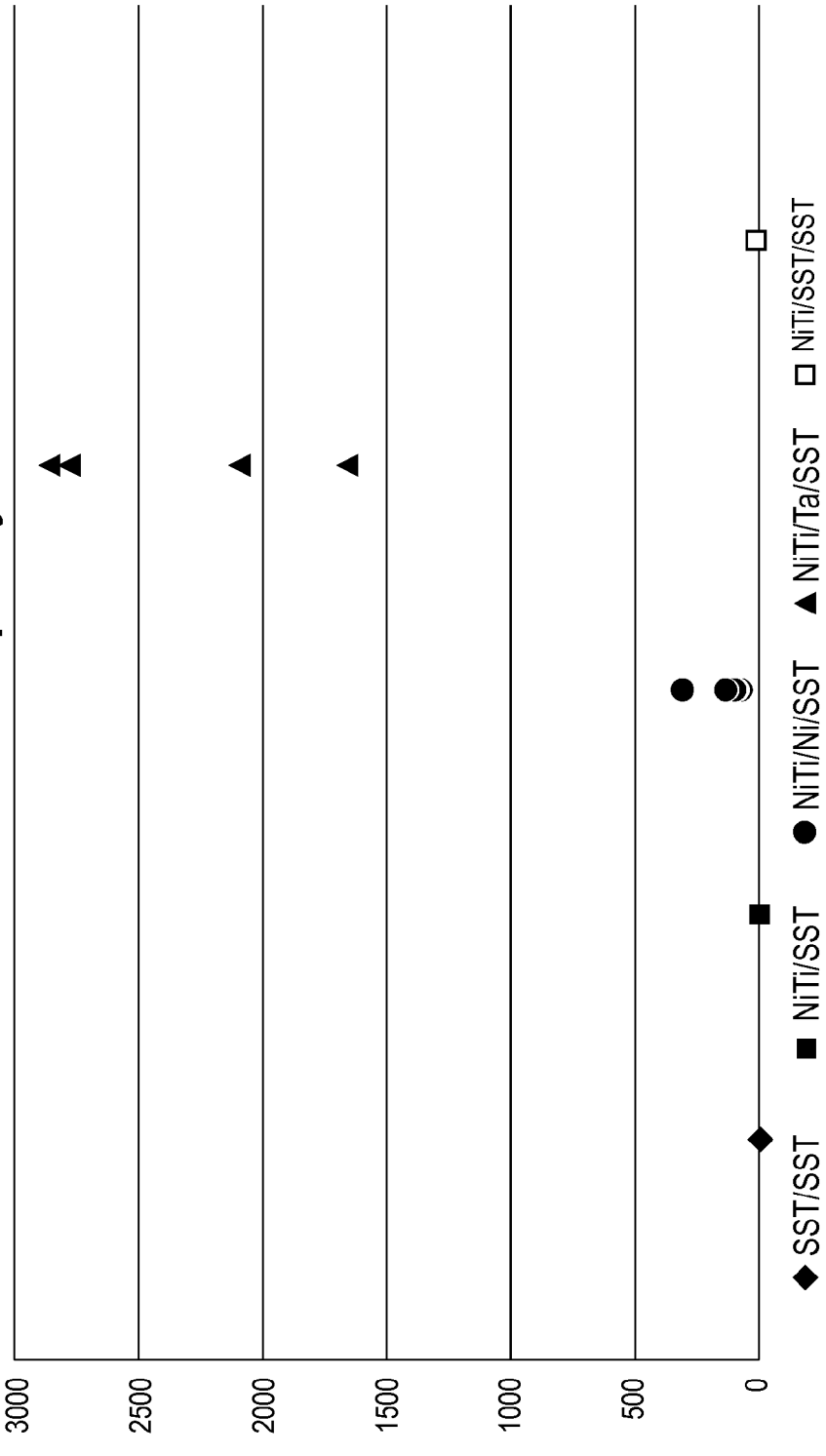

FIG. 10

| Material/Test | • SST Core<br>• SST Coil | • Nitinol Core<br>• SST Coil | • Nitinol Core<br>• Nickel Washer<br>• SST Outer Coil | • Nitinol Core<br>• Tantalum Inner Coil<br>• SST Outer Coil | • Nitinol Core<br>• SST Inner Coil<br>• SST Outer Coil |
|---|---|---|---|---|---|
| Standard Pull (pounds) | 9.74<br>10.12<br>10.32<br>11.52 | 6.60<br>7.47<br>9.97<br>12.74 | 3.38<br>4.46<br>13.25<br>16.79 | 24.22<br>24+<br>24+<br>24+ | n/a |
| Turns to Failure (# of turns) | 1/2<br>2/3<br>2/3<br>3/4 | 7.5<br>8.25<br>8.75<br>10 | 3.75<br>4.25<br>5.25<br>6.25 | 7<br>9<br>10.75<br>12.5 | n/a |
| Cyclical turns To Failure (# of cycles) | 1.8 revs<br>1.8 revs<br>2.1 revs<br>2.5 revs | 1.2<br>1.5<br>1.7<br>2 | 67<br>88<br>138<br>308 | 1663<br>2090<br>2777<br>2858 | 0.25 revs<br>2.5 revs<br>4.3 revs<br>9 revs |
| Fatigue Pull (# of pulls) | 626<br>911<br>2007+<br>3276+ | 1<br>2<br>2<br>119 | 77<br>153<br>1135+<br>16548+ | 2272+<br>2780+<br>6492<br>8726+ | n/a |

Nitinol core, sst coil

Nitinol core, tantalum inner coil, sst outer coil

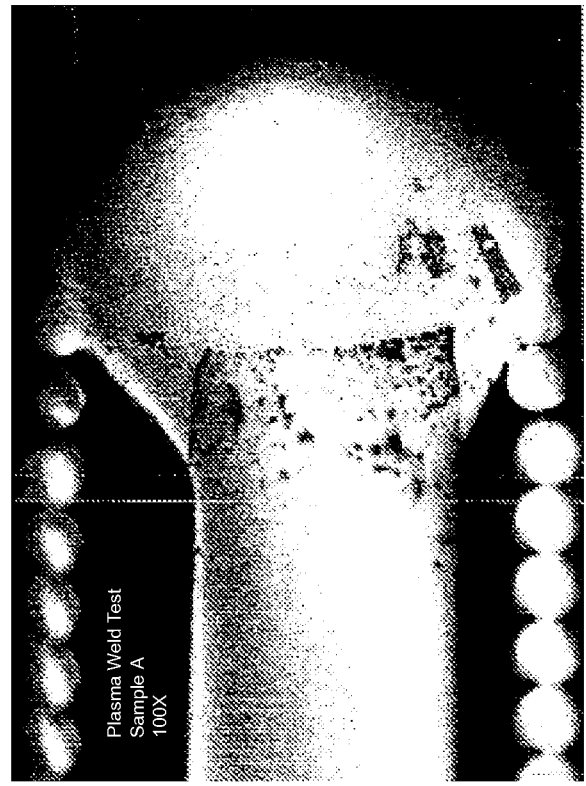
FIG. 14 Stainless steel core, set coil
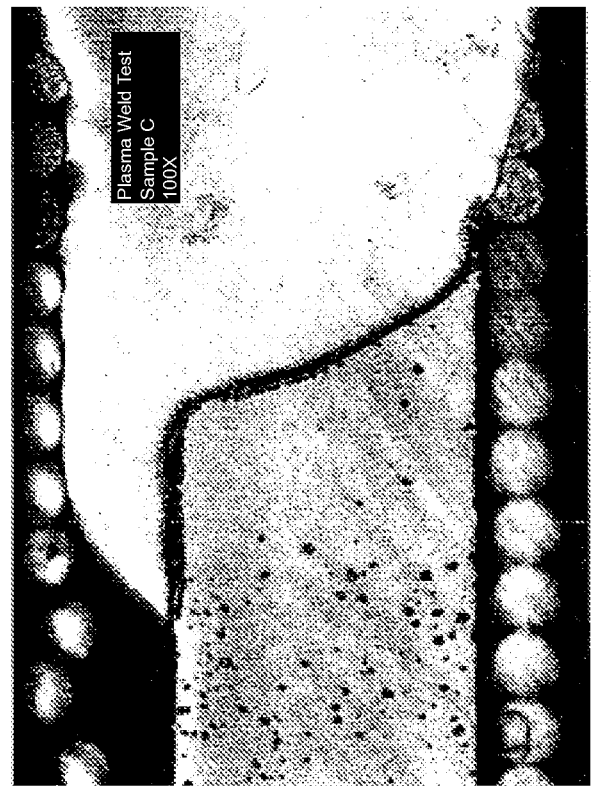
FIG. 13 Nitinol core, nickel washer, sst coil

METHOD OF JOINING TITANIUM AND TITANIUM-BASED ALLOYS TO FERROUS METALS USING TANTALUM

A method of joining, e.g., by fusion welding, titanium, and titanium-based alloys to ferrous metals, and the intermetallic weld pool created by practice of the method is described. Welding of titanium, and titanium-based alloys, is plagued with poor quality and highly brittle welds, substantially due to formation of Ti—Fe intermetallics in the weld pool. The instant invention involves the use or deployment of tantalum in the weld pool to create a surprisingly strong intermetallic bond.

TECHNICAL FIELD

The present invention relates to the field of material joining; particularly, to a method of joining titanium, and titanium-based alloys workpieces, to ferrous metals workpieces e.g., by welding.

BACKGROUND OF THE INVENTION

Titanium and titanium alloys have become important structural metals due to an unusual combination of properties. These alloys have strength comparable to many stainless steels at much lighter weight. Additionally, they display excellent corrosion resistance, superior to that of aluminum and sometimes greater than that of stainless steel. Further, titanium is one of the most abundant metals in the earth's crust and, as production methods become more economical, it will be employed in ever growing applications.

Various alloys of titanium and nickel are part of the alloy class known as shape memory alloys (SMAs). This term is applied to that group of metallic materials (also known as nickel-titanium alloys) that demonstrate the ability to return to a defined shape or size with thermal processing. In a most general sense, these materials can be plastically deformed at some relatively low temperature and return to their pre-deformation shape upon some exposure to higher temperatures. This shape memory effect (as it is sometimes called) i.e., the ability to exhibit a temperature dependent change in shape or configures, finds numerous commercial, especially medical, applications.

Nickel-titanium SMAs undergo a phase transformation in their crystalline structure when cooled through a transition temperature from the relatively stronger, high temperature or "Austenite (or austenitic)" form to the relatively weaker, low temperature or "Martensite (or martensitic)" form. Such crystalline transformations are responsible for the hallmark characteristics of these materials; their thermal, or shape memory; and their mechanical memory.

The characteristics of titanium and titanium-based alloys (conversely nickel-titanium alloys), especially their shape memory, means they have been widely used as components of medical devices such as catheters, stents, guidewires, blood filters, stylettes, and numerous other devices.

A major limitation in the use of titanium and nickel-titanium alloys has been the difficulty of joining these materials to other materials. Because of its high cost, it is often desirable to limit the use of nickel-titanium to the actual moving parts of a device, while fabricating supporting members from less expensive materials such as stainless steel or other ferrous metals. However, welding of nickel-titanium to stainless steel and to ferrous metals in general has proved to be particularly difficult, as disclosed by Ge Wang, in a review "Welding of Nitinol to Stainless Steel."

In addition, the reactivity of titanium makes it important that any welding be done in a clean, inert atmosphere e.g., as argon blanket, or in a vacuum, to reduce the tendency to form damaging oxides or nitrides. Nickel-titanium alloys materials naturally form surface oxides in air during processing into finished form making the use of an inert atmosphere (or vacuum) of lesser importance. The principal surface oxide formed is $TiO_2$.

However, the difficulty of joining nickel-titanium to other materials, such as stainless steel, has remained exceedingly limiting to the art. Many techniques have been employed with limited success. Non-fusion joining methods are most commonly used to join nickel-titanium; including soldering, epoxies and other adhesives; and various types of mechanical joining such as crimping. These techniques are not without their drawbacks. Soldering, for example, must often be accomplished with special flux to remove and inhibit the formation of surface oxides during soldering. Epoxies and adhesives are not suitable for all manufacturing techniques and types of uses to which these nickel-titanium products are directed. Mechanical fastening may cause over deformation and cracking of the nickel-titanium. Interference fit or the interlocking of components has been successful, but requires manufacturing to close dimensional tolerances.

Various methods have been used to attempt to improve results in welding of titanium alloys to ferrous metals. Those methods are variously described in the following United States patents which are incorporated by reference in their entireties herein:

U.S. Pat. No. 4,674,675
U.S. Pat. No. 3,038,988
U.S. Pat. No. 4,708,282
U.S. Pat. No. 6,410,165
U.S. Pat. No. 6,875,949 to Peter C. Hall, also incorporated by reference herein discloses a method of welding titanium metals and ferrous metals using nickel or iron added to the weld pool. The '949 patent discourages the use of aluminum, chromium and titanium (col. 8, line 49, et seq.) stating that they do not improve weld quality between titanium metals and ferrous metals.

Accordingly, the art has needed a means for improving the art of fusion welding titanium, and titanium-based alloys, to ferrous metals. In its most general sense, the present invention overcomes the problems experienced in this art and provides an improved method of welding titanium, or titanium-based alloys, to ferrous metals e.g., metals, steel, other alloys, eutectic mixtures containing or comprising any appreciable amount of iron. A preferred embodiment of this invention is an improved method of welding nickel-titanium alloy e.g., the alloy known as nitinol, and stainless steel. This invention is particularly applicable to the medical device art, e.g., guidewire.

BRIEF SUMMARY OF THE INVENTION

Briefly, in one aspect, this invention is a method of welding titanium, or titanium-based alloy, to a ferrous metal to produce a strong and ductile weld by inclusion of tantalum in the weld.

The method comprises in general, the steps of placing at least one titanium, or a titanium-based alloy workpiece in close proximity to a ferrous metal workpiece and a suitably shaped tantalum workpiece, thereby forming or defining a joint precursor or joint. Shielding may be provided around the joint precursor, such as by way of example, placing the workpieces in a vacuum or flooding or blanketing the joint precursor with inert gas.

The joint precursor is then fusion welded, by any of various means of fusion welding, including, in a preferred embodiment, pulsed laser welding to create a weld pool and, upon cooling, the joint or weld. Fusion welding produces a liquidus or eutectic weld pool fully incorporating the tantalum, the titanium or titanium-based alloy and the ferrous metal.

This method is generally applicable to all titanium or titanium-based alloys (and conversely nickel-titanium alloys) and ferrous metal combinations. The workpieces may be in any shape, including sheet, bar, tube, or, in the preferred embodiment, wire. Optional steps include cleaning and stress relieving the workpieces prior to welding, after welding, or both.

A preferred application of this invention is to join dissimilar metal components of a medical device. By way of illustration and not by way of limitation, medical guidewires having a nitinol core at least partially surrounded by a stainless steel distal coil may be manufactured by plasma welding the core to the coil in the presence of tantalum or with the introduction to the weld pool, and thus to the joint, of a suitable quantity of tantalum. The weld pool then is cooled to provide the unexpectedly tactile, strong weld, bond or joint.

These variations, modifications, alternatives, and alterations of the various preferred embodiments, processes, and methods may be used alone or in combination with one another as will become more readily apparent to those with skill in the art with reference to the following detailed description of the preferred embodiments and the accompanying figures and drawings.

It is to be understood that the present invention while illustrated in the context of medical devices, e.g., guidewires, it is broadly applicable to the creation of any joint or weld involving titanium or titanium alloys and ferrous metals.

BRIEF DESCRIPTION OF THE DRAWINGS

Without limiting the scope of the present invention as claimed below and referring now to the drawings and figures.

FIGS. 1-4 show generally an application of this invention. Specifically FIG. 1 show an elevation view of titanium, or titanium-based alloy workpiece 100 and a ferrous metal workpiece 200 in the embodiment of two adjacent wire (i.e., 100 and 200) with a joint precursor 300 between their ends;

FIGS. 2A and 2B show an elevation view of the wires of FIG. 1, wherein the joint (bracket 300) has a tantalum workpiece 310 placed therein.

FIG. 3 shows an elevation view of the wires, joint, and tantalum of FIGS. 2 (100, 200, 300, and 310, respectively) filled with a tantalum workpiece 310. Fusion welding means 400 is also shown.

FIG. 4 shows an elevation view of the wires of FIG. 2 during formation of a weld pool 600.

FIG. 6 shows the Standard Pull Strengths of the weld systems evaluated using the test piece of FIG. 5;

FIG. 7 shows 6 lb. Fatigue Pull, Number of Pulls to Failure for the systems of FIG. 6 using the test piece configuration of FIG. 5;

FIG. 8 shows Turns to Failure Test Results for the systems tested (i.e., welds) in FIG. 6;

FIG. 9 shows Cyclical Turns to Failure, 3 Clockwise—3 counterclockwise Turns per Cycle for the weld tested in FIG. 6;

FIG. 10 shows the numerical values of the data using the test piece configuration of FIG. 5 and illustrated in FIGS. 6-9;

FIG. 13 is a sectioned photomicrograph of the distal end of a medical guidewire with a nitinol core fusion welded to a nickel washer and a stainless steel coil. A nickel washer was used to mimic the use of a nickel inner coil. A nickel inner coil would not normally by used to produce a guidewire because nickel, in contrast with tantalum, is not sufficiently radiopaque to mark the guidewire distal end.

FIG. 14 is a sectioned photomicrograph of a stainless steel guidewire core fusion welded to a stainless steel coil.

DETAILED DESCRIPTION OF THE INVENTION

Figure 2B:
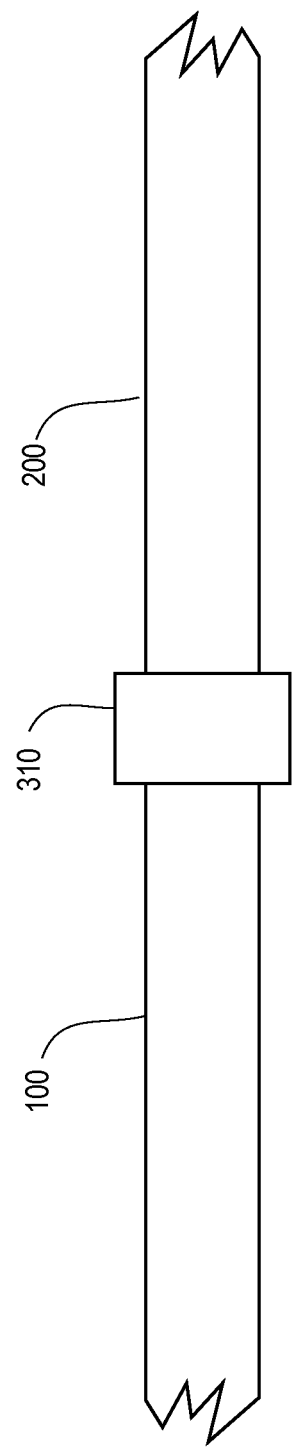

The method of fusion welding titanium, or titanium-based alloys, to ferrous metals or by the inclusion in the presence of tantalum in the weld enables a significant advance in the state of the art. In particular, the method produces a weld zone or weld that is substantially free of certain intermetallic compounds or alloys, such as, by way of example and not limitation, FeTi and $TiFe_2$, which cause brittleness of the weld bond. The detailed description set forth below in connection with the drawings and claims is intended merely as a description of the presently preferred embodiments of the invention, and is not intended to represent the only form in which the present invention may be constructed or utilized.

It is to be understood that usage of the term "tantalum" in this application is intended to include essentially pure tantalum as well as tantalum-based alloys, mixtures, and eutectics which are substantially or predominantly tantalum. Any such tantalum alloy or mixture within the scope of this invention will provide the performance characteristics of substantially pure tantalum in the creation of weld pools, welds, or joints in the bonding or joining of titanium or titanium-based alloy workpieces to ferrous metal workpieces. Generally speaking, tantalum and tantalum-based alloys will comprise no more than about 35 atomic percent of any material in the alloy or mixture other than tantalum.

The term "fusion weld", as used in this invention, is to be broadly construed to mean any of the techniques well known to the art in which a liquidus weld, weld pool or eutectic mixture is created in the process of bonding one material to another. Exemplary and not limiting fusion weld techniques include laser welding, electron beam welding, tungsten inert gas welding, plasma welding and other techniques suggested by this list.

The terms "titanium-based alloy" or "titanium-based system" as used herein are to be broadly construed to mean systems containing the two mentioned metals which exhibit the difficult bonding characteristics of nitinol Titanium-based systems generally will contain significant atomic percentages of nickel with the titanium and nickel being present in an intermetallic phase. Without limitation shape memory alloys as used in this invention, and as used to produce medical devices will consist essentially of about 48 to about 52 atomic percent nickel and conversely, from 52 to about 48 atomic percent titanium. Titanium-based alloys can and often do include additional elements such as copper, niobium, gold, palladium, platinum, hafnium and zirconium. The presence of any such third elements, according to this invention, is to be at a lesser atomic percentage than will materially inhibit the characteristic of shape memory effect in the resulting alloy or eutectic mixture. Alternative characterizations of materials to be included in this definition are those titanium-based alloys or eutectics which exhibit the phenomenon described as being "super elastic" at the temperature of their intended use.

With reference generally now to FIGS. 1 through 13, the method comprises a method of welding titanium, or a titanium-based alloy workpiece 100 to a ferrous metal workpiece 200 to produce a strong ductile weld, comprising, in general, the steps, seen in FIGS. 1 through 4, of placing at least one titanium, or a titanium-based alloy, workpiece 100, in close proximity to at least one ferrous metal workpiece 200 thereby forming a joint precursor 300. A quantity of a tantalum material 310 such as a tantalum coil or a tantalum workpiece is added concurrently or subsequently with formation of the joint precursor substantially at the joint precursor 300. Shielding optionally is provided around the joint precursor, such as by way of example and not limitation, placing the workpieces 100, 200 in a vacuum or by flooding the joint precursor 300 with inert gas.

With reference now to FIG. 4, the joint precursor 300 is then fusion welded, by application of the fusion welding means 400 of any of the numerous processes of fusion welding, including by way of example, laser welding. In one embodiment, the fusion welding means 400 producing the weld pool 600 is produced by a beam of a laser, and this laser beam may further be pulsed during the fusion welding. The fusion welding produces a weld pool 600 fully incorporating the tantalum 310 to achieve the desired composition of the weld pool.

Numerous refinements and variations of the basic method are possible. While the method is generally applicable to all titanium, and titanium-based alloys, and ferrous metal combinations, in one particular embodiment the titanium or titanium-based alloy workpiece 100 is nickel-titanium and the ferrous metal workpiece 200 may be stainless steel.

To promote the general quality of the weld, a further step of cleaning the titanium or the titanium-based alloy workpiece 100 and the ferrous metal workpiece 200 (either before or after the welding process, or both) to substantially remove contaminants.

While the number of material forms amenable to this technique is theoretically not limited, one such combination of workpieces, seen in FIG. 2 may have the titanium, or the titanium-based alloy workpiece 100, as a titanium or titanium-based alloy wire. The ferrous metal workpiece 200 may also be wire.

To select one of the many combinations of workpiece materials, by way of example and not limitation, the titanium, or the titanium-based alloy, wire 100 may be nickel-titanium, the ferrous metal wire 200 may be stainless steel, and the material associated therewith may be substantially pure tantalum. The titanium, or titanium alloy, workpiece 100 and the ferrous metal workpiece 200 may be in any form, such as by way of example and not limitation, ribbon, sheet, bar, tubing including microtubing, solid wire, stranded wire, braided wire, sputtering targets, and thin films.

Figure 5A:
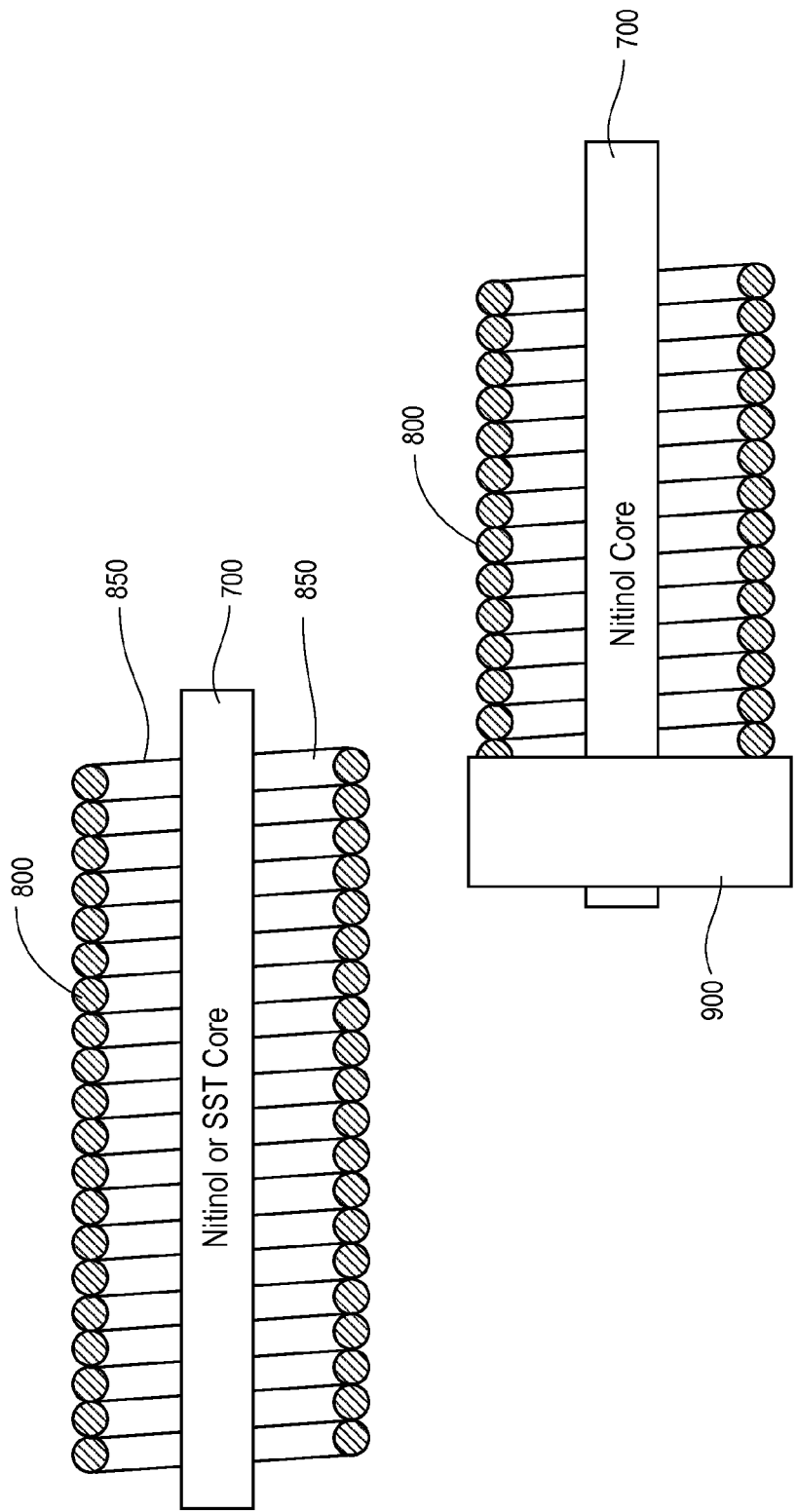
FIG. 5 illustrates the test piece configuration used to generate the weld characterization data discussed herein.

FIG. 5A shows a Test Piece Configuration used to evaluate welds produced according to the prior art and this invention. What is shown is the distal end of a medical guidewire comprising a nitinol core wire 700, a stainless steel outer guidewire coil 800, a tantalum or stainless steel (depending upon the test) inner coil 850 and a distal end nickel washer 900. It will be appreciated that the intendment of this process as it relates to guidewires was to create a bond between the nitinol core wire 700 and a stainless steel coil 800, the weld becoming, after optional further processing, an guidewire distal tip. For comparison purposes a stainless steel core/stainless steel coil system also were evaluated. It will also be appreciated that the tantalum coil is radiopaque making is particularly useful to visualize during guidewire usage.

FIG. 5B shows a guidewire obtained by the use of the present invention. It is to be understood that the device shown in FIG. 5B is illustrative of one application of this invention, the invention not to be construed as being limited thereto. In FIG. 5B a nitinol core wire 210 is shown being plasma welded by means of plasma welder 700 (the plasma welder 700 is shown schematically to a ferrous metal coil 610. Optional radiopaque inner marker coil 510 is also being plasma welded to core wire 210 all by means of tantalum-containing weld or weld pool 810. Weld pool 810 upon cooling is a rounded atraumatic guidewire extreme distal end, a structure otherwise known to the guidewire art. The use of a tantalum disc, plug, or workpiece to create weld pool 810 couples the guidewire core wire and outer coil with a remarkably strong and resilient weld (see the test data below).

A further approach of this invention would be simply for radiopaque inner coil 510 to comprise tantalum. Since tantalum is radiopaque, coil 510 provides a radiopaque marker and the tantalum required by this invention to create the weld pool/atraumatic tip.

FIG. 6 show the standard pull strength results taken with respect to the welds created using the test piece of FIG. 5. Surprisingly and unexpectedly the "NiTi/Ta/SST" system of this invention produced pull strength results in excess of 24 lbs, and exceeded the strength of the collect used to measure the numbers. In short the actual pull strength for a system of this invention exceed the measurement capability of the test fixture and may well have been off the chart.

FIG. 7 shows the number of 6 lb. pulls to failure for the systems. With the exception of the single data point for the NiTi/Ni/SST system in the 9000 pulls to fatigue, believed to be anomalous, the NiTi/Ta/SST system of this invention performed dramatically better than the other systems evaluated.

FIG. 8 shown "Turns to Failure" for the systems evaluated. The results of this evaluation, in addition to showing an unexpectedly strong NiTi/SST weld performance, confirms the unpredicted superiority of the NiTi/Ta/SST system of this invention.

FIG. 9 shows the results of the cyclical turns to failure for the welds evaluated. In this test the NiTi/Ta/SST system of this invention exhibited vast superiority over all of the other welds evaluated.

FIG. 10 shows the numbers obtained on which FIGS. 6-9 are based.

Figure 12:
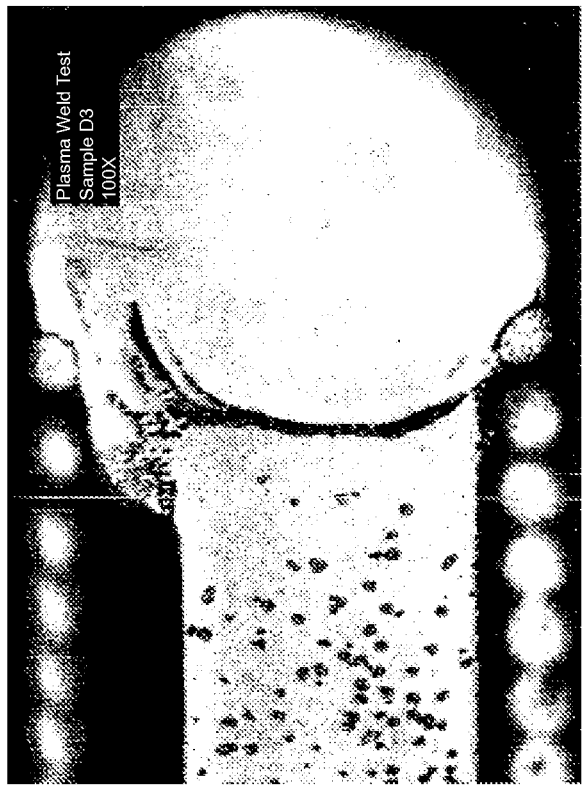
FIG. 12 is a sectioned photomicrograph of the distal end of a guidewire having a conventional nitinol core fusion welded to a stainless steel coil.
Figure 11:
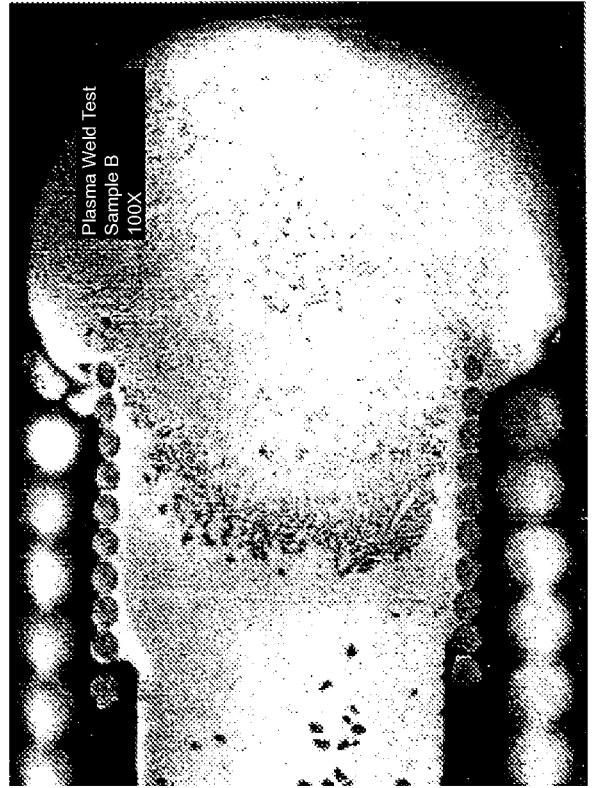
FIG. 11 is a sectioned photomicrograph of the distal end of a medical guidewire showing the weld produced in a practice of this invention utilizing a nitinol core, a stainless steel outer coil and tantalum inner coil.

FIGS. 11, 12, and 13 are sectioned photomicrographs of three of the four weld systems evaluated herein. The SST coil/SST core system was omitted because the SST core wire would not have the shape memory performance characteristics of a nitinol core wire. The cross sections clearly show the individual components as well as the weld pool that resulted in the weld-forming process (which coincidentally creates the distal ball on the end of a guidewire). The weld pool shows a laminar flow of the molten material penetrating into the core. This shows at a microscopic level the benefit provided by deployment of tantalum, i.e., uniform interpenetration of the phases of the nickel-based nitinol alloy and the stainless steel coil. Further, a distinct gap is shown for both the nitinol core/stainless steel weld (FIG. 12) and the nitinol core/nickel washer/stainless steel weld (FIG. 13). Those gaps are believed to be the reason for the weakness of the joint.

It is understood that bonding of distal end guidewire components using a tantalum coil as shown herein is particularly preferred because, in addition to creating a measurably improved weld, radiopaque guidewire distal tip markers are provided by the presence of tantalum. In summary, use of tantalum as described herein provides stronger, more flexible weld, which can be visualized by x-ray examination.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute, and/or additional or alternative materials, relative arrangement of elements, and dimensional configurations. Accordingly, even though only a few variations of the present invention are described herein, it is to be understood that the practice of such additional modifications and variations and the equivalents thereof, are within the spirit and scope of the invention as defined in the following claims.

The corresponding structures, materials, acts, and equivalents of all means or step plus function elements in the claims below are intended to include any structure, material, or acts for performing the functions in combination with other claimed elements as specifically claimed.

What is claimed is as follows:

1. A method of joining titanium, or a titanium-based alloy, to a ferrous metal to produce a strong ductile weld, comprising the steps of:
   a) providing a tantalum joint precursor extending along a longitudinal axis, wherein the tantalum joint precursor has an outer face aligned substantially perpendicular to the axis;
   b) providing a ferrous metal coil extending from a proximal coil end to a distal coil end, and placing the proximal coil end of the ferrous metal in close proximity to the outer face of the tantalum joint precursor;
   c) providing at least one titanium or titanium-based alloy workpiece extending from a titanium workpiece proximal end to a titanium workpiece distal end, and placing the proximal end of the at least one titanium or titanium-based alloy workpiece in close proximity to the outer face of the tantalum joint precursor,
   d) wherein, with respect to the longitudinal axis, the titanium or titanium-based alloy workpiece resides radially inside the ferrous metal coil;
   e) fusion welding the tantalum joint precursor thereby producing a weld pool incorporating the proximal end of the at least one titanium, or titanium-based alloy workpiece, and the proximal end of the ferrous metal coil, and a portion of the outer face of the tantalum joint precursor; and
   f) permitting the weld pool to cool and form a weld connected to the titanium or titanium-based alloy workpiece and the ferrous metal coil,
   g) wherein the titanium or titanium-based alloy workpiece and the ferrous metal coil extend away from the tantalum in the same axial direction.

2. The method of claim 1, including providing the at least one titanium, or titanium-based alloy workpiece being nickel-titanium and the at least one ferrous metal workpiece being stainless steel.

3. The method of claim 1, further including a step of cleaning the titanium, or the titanium-based alloy workpiece and the ferrous metal workpiece to remove contaminants prior to placing their respective proximal ends in close proximity to the outer face of the tantalum joint precursor.

4. The method of claim 1, including providing the titanium, or the titanium-based alloy workpiece being a titanium, or titanium-based alloy wire.

5. The method of claim 4, including providing the titanium, or the titanium-based alloy wire being nickel-titanium.

6. The method of claim 1, including using the beam of a laser to produce the weld pool.

7. The method of claim 6, including pulsing the laser beam during the fusion welding.

8. The method of claim 1, including providing the titanium or titanium-based alloy being nitinol.

9. The method of claim 1, including providing the ferrous metal coil being stainless steel.

10. The method of claim 1, including configuring the titanium or titanium-based alloy workpiece and the ferrous metal workpiece as components of a medical device.

11. The method of claim 10, including providing the titanium or titanium-based alloy workpiece as a core wire for a guidewire and the ferrous metal coil as a stainless steel guidewire coil.

12. The method of claim 1, including providing the weld-pool being substantially free of brittle intermetallic compounds.

13. The method of claim 1, including providing:
   i) the ferrous metal coil having a first length extending between and to the ferrous metal coil proximal and distal ends; and
   ii) the titanium or titanium-based alloy workpiece having a second length extending between and to the titanium workpiece proximal and distal ends, and
   iii) wherein the second length of the titanium or titanium-based alloy workpiece disposed radially inside the ferrous metal coil is substantially longer than the first length of the ferrous metal coil.

14. The method of claim 1, wherein in the weld and with respect to the longitudinal axis, the tantalum joint precursor is not intermediate the titanium or titanium-based alloy workpiece and the ferrous metal coil.

15. A method of joining titanium, or a titanium-based alloy, to a ferrous metal to produce a strong ductile weld, comprising the steps of:
   a) providing a tantalum joint precursor extending along a longitudinal axis, wherein the tantalum joint precursor has an outer face aligned substantially perpendicular to the axis;
   b) providing a ferrous metal coil extending from a proximal coil end to a distal coil end, and placing the proximal coil end of the ferrous metal in close proximity to the outer face of the tantalum joint precursor;
   c) providing at least one titanium or titanium-based alloy workpiece extending from a titanium workpiece proximal end to a titanium workpiece distal end, and placing the proximal end of the at least one titanium or titanium-based alloy workpiece in close proximity to the outer face of the tantalum joint precursor,
   d) wherein, with respect to the longitudinal axis, the titanium or titanium-based alloy workpiece is not in contact with the ferrous metal coil at the tantalum joint precursor, but the titanium or titanium-based alloy workpiece resides radially inside the coil;
   e) fusion welding the tantalum joint precursor thereby producing a weld pool incorporating the proximal end of the at least one titanium, or titanium-based alloy workpiece, and the proximal end of the ferrous metal coil, and a portion of the tantalum joint precursor; and f) permitting the weld pool to cool and form a weld connected to the titanium or titanium-based alloy workpiece and the ferrous metal coil, g) wherein the titanium or titanium-based alloy workpiece and the ferrous metal coil extend away from the tantalum in the same axial direction.

16. A guidewire, comprising:
a) a tantalum joint precursor extending along a longitudinal axis, wherein the tantalum joint precursor has an outer face aligned substantially perpendicular to the axis;
b) a ferrous metal coil extending from a proximal coil end to a distal coil end;
c) at least one titanium or titanium-based alloy wire extending from a titanium wire proximal end to a titanium wire distal end;
d) a weld incorporating the proximal end of the at least one titanium, or titanium-based alloy wire, the proximal end of the ferrous metal coil, and a portion of the outer face of the tantalum joint precursor,
e) wherein, with respect to the longitudinal axis, the titanium or titanium-based alloy wire is disposed radially inside the ferrous metal coil, and
f) wherein the titanium or titanium-based alloy workpiece and the ferrous metal coil extend away from the tantalum in the same axial direction.

17. The guidewire of claim 16, wherein, with respect to the longitudinal axis, the tantalum joint precursor is not radially intermediate the titanium or titanium-based alloy wire and the ferrous metal coil.

18. The guidewire of claim 16, wherein the titanium, or the titanium-based alloy wire is nickel-titanium.

19. The guidewire of claim 16, wherein the ferrous metal coil is stainless steel.

20. The guidewire of claim 16, wherein the titanium or titanium-based alloy wire disposed radially inside the ferrous metal coil is not in contact with the ferrous metal coil at the weld.

* * * * *